United States Patent [19]
Louis et al.

[11] 3,833,424
[45] Sept. 3, 1974

[54] GAS FUEL CELL BATTERY HAVING BIPOLAR GRAPHITE FOAM ELECTRODES

[75] Inventors: Gerhard Louis, Hofheim; Harald Bohm, Glashutten, both of Germany

[73] Assignee: Licentia Patent-Verwaltungs-G.m.b.H., Frankfurt, Germany

[22] Filed: Mar. 27, 1973

[21] Appl. No.: 345,458

[30] Foreign Application Priority Data
Mar. 28, 1972 Germany............................. 2215070

[52] U.S. Cl............... 136/86 R, 136/86 R, 136/121
[51] Int. Cl. ......................................... H01m 27/04
[58] Field of Search.................. 136/86 R, 121, 86 D

[56] References Cited
UNITED STATES PATENTS

| | | | |
|---|---|---|---|
| 2,658,099 | 11/1953 | Basset................................ | 136/121 |
| 3,589,942 | 6/1971 | Leitz, Jr. et al.................... | 136/86 D |
| 3,692,585 | 9/1972 | Mayo................................ | 136/121 X |
| 3,746,578 | 7/1973 | Warzawski....................... | 136/86 R |
| 3,764,391 | 10/1973 | Warzawski et al................ | 136/86 D |

FOREIGN PATENTS OR APPLICATIONS

| | | | |
|---|---|---|---|
| 350,100 | 10/1905 | France............................. | 136/86 R |

*Primary Examiner*—A. B. Curtis
*Attorney, Agent, or Firm*—Spencer & Kaye

[57] ABSTRACT

A gas fuel cell battery is formed of a series of alternating bipolar electrodes and cell frames. Each bipolar electrode comprises a flexible graphite foam foil and active (anode and cathode) layers secured to opposite foil faces. Each face of a cell frame is in engagement with a bipolar electrode along a marginal zone of the foil that is outside the perimeter of the active layer. Gas is contacting that face of each active layer that is oriented towards the foil to which it is secured, while electrolyte is contacting that face of each active layer that is oriented away from the foil to which it is secured. The active layers are provided with openings for the gas supply, while the cell frames have throughgoing bores and channels for the electrolyte supply.

11 Claims, 6 Drawing Figures

GAS FUEL CELL BATTERY HAVING BIPOLAR GRAPHITE FOAM ELECTRODES

BACKGROUND OF THE INVENTION

This invention relates to a gas fuel cell battery of the type that includes bipolar electrodes, cell frames, clamping plates and means for effecting a circulation of the electrolyte.

In a known bipolar-contacted fuel cell battery there is provided a stationary phosphoric acid electrolyte. In this structure the electrolyte is immobilized in a suction layer. The cell separator wall of the bipolar electrode which carries the anode on one face and the cathode on the other, is not flexible; it is formed of a sintered material or of electrographite on which gold layers are deposited. For the admission and distribution of gas, the electrodes are provided, on opposite sides, with parallel slots through which the gas passes. In other known structures the electrodes are affixed to a special frame by glue or by a poured-in filler and the individual frames carrying the electrodes are held by clamping. The method of gluing the electrode to a frame is disadvantageous in that there will be an appreciable loss in the active electrode surface since the marginal zones of the electrodes are used for performing the adhesive bond. The gluing operation requires a high-precision process for the economical and uniform application of the adhesive. Further, particular difficulties are encountered in maintaining the supply channels for the gas and electrolyte open up to and including the electrode edge. The aforenoted gluing process is practically unfeasible in case of densely adjoining gas chambers for two different gases as it is necessary for bipolar electrodes.

The use of a poured-in filler to immobilize battery units requires an additional sealing of the required electrolyte and gas chambers to ensure that the poured material does not flow into these spaces. This additional sealing measure gives rise to complications and additional expenses when the battery units are stored and when the additional sealing elements are dissolved. The loss in the active electrode surface is even greater than that experienced in the gluing process.

Further, the percentage of rejects is proportionate to the number of poured-in electrodes in the battery unit. In addition to the problem regarding corrosion-resistant poured materials there also arise problems of strength because of clamping conditions which appear due to the shrinkage of the poured material during hardening and the rigid bond between materials that have different temperature coefficients.

It is an object of the invention to provide an improved high-voltage fuel cell battery which is of very simple structure and which is operationally safe.

It is a further object of the invention to provide an improved high-voltage fuel cell battery which operates on non-purified gases and in which corrosion problems normally arising in particular in the use of contacting metals are avoided.

It is also an object of the invention to provide an improved high-voltage fuel cell battery in which, by virtue of a circulated main electrolyte stream all individual cells contained in the battery are exposed to a rinsing effect of the electrolyte for the purpose of equalizing heat and concentration.

It is further an object of the invention to provide an improved high-voltage fuel cell battery in which an optimal utilization of the electrode surfaces is possible and wherein the smallest possible distance between electrodes is accomplished.

It is still another object of the invention to provide an improved high-voltage fuel cell battery in which there is achieved, at low pressure, a uniform distribution of gases over the entire surface of the electrodes.

It is still another object of the invention to provide an improved high-voltage fuel cell battery in which defective components may be easily replaced.

SUMMARY OF THE INVENTION

These objects and others to become apparent as the specification progresses are accomplished according to the invention in which, briefly stated, the battery is formed of bipolar electrodes and cell frames arranged alternatingly in a juxtapositioned face-to-face series. Each bipolar electrode is formed of a flexible graphite foam foil carrying on each face an active electrode layer which leaves free a marginal zone of the foil. At the gas side each active layer and the adjoining face of the foil to which it is attached, bound a closed gas chamber. Each active layer is provided with bores providing access to the gas chambers for an air and fuel gas supply. The cell frames serve for the elastic clamping of the bipolar electrodes by securing the graphite foam foils at their edges to the cell frame. The latter are provided with electrolyte channels communicating with the principal bores through which the electrolyte flows.

DESCRIPTION OF THE PREFERRED EMBODIMENT

Figure 1:
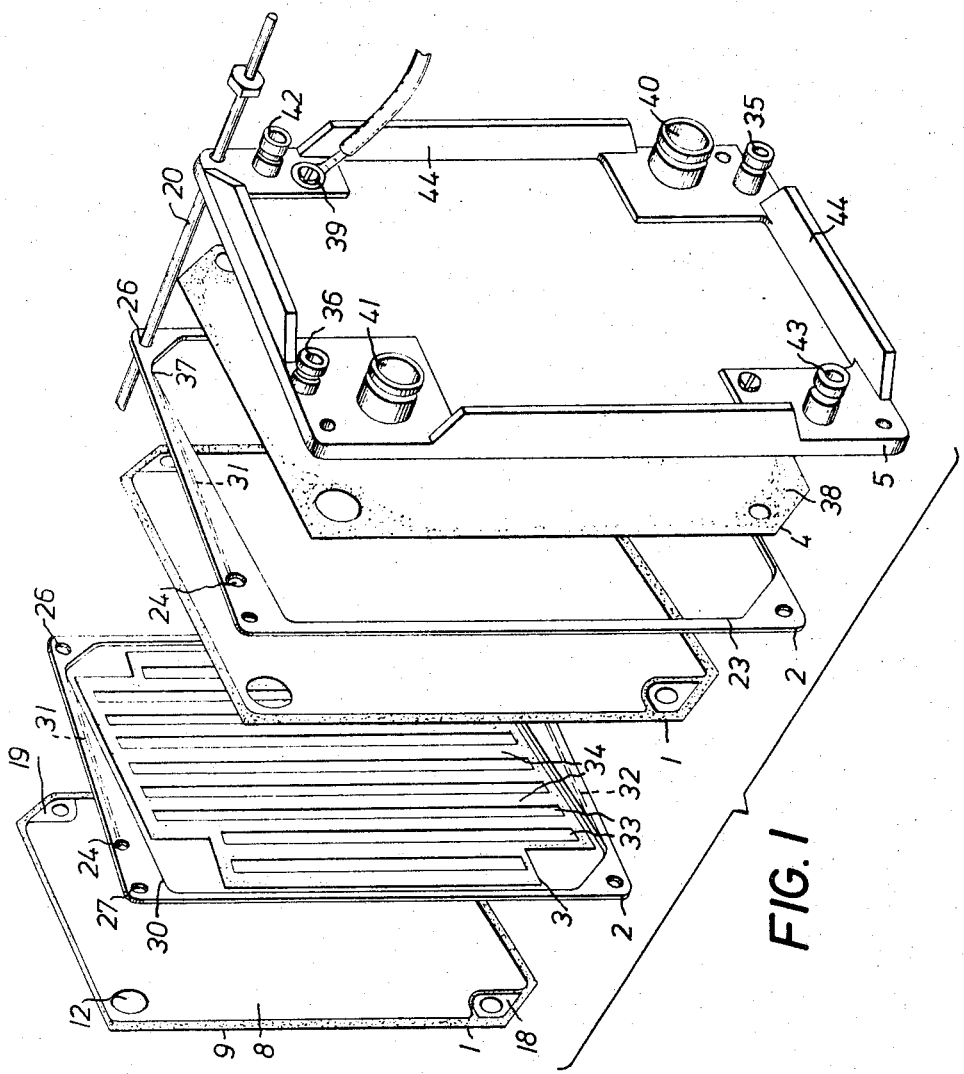
FIG. 1 is a perspective exploded view illustrating the basic structure of the battery according to a preferred embodiment of the invention.

Turning now to FIG. 1, the fuel cell battery according to the preferred embodiment of the invention is formed by the repetitive provision of the following three components: a bipolar electrode 1, a cell frame 2 and a separator grid or comb 3 disposed in the cell frame 2. For the completion of the fuel cell battery, there are further provided two end electrodes 4 (only one shown) and two clamping plates 5 (only one shown).

By virtue of a bipolar contacting, a series connection of all cells is accomplished without external electric connections.

As it is seen from FIGS. 2a, 2b, and 3 and 4, the bipolar electrode is formed of only three components: an elastic graphite foam foil 6 of a thickness of approximately 0.2 mm and two elastic catalyst layers 7 and 8 (an anode and a cathode) which have a thickness of approximately 1 mm each and which are directly secured to and electrically contacted with the graphite foam foil 6. The latter projects beyond the perimeter of the catalyst layers 7, 8 so that there is obtained a foil margin 9 of approximately 3 mm wide which, for the purpose of supporting the bipolar electrode 1, is sandwiched between adjacent cell frames 2 (FIG. 1). It is thus seen that each bipolar electrode 1 is supported solely by clamping it at its margin 9 between two cooperating cell frames 2. The margin 9 of the graphite foam foil 6 also serves as a seal for an electrolyte-tight closing of the individual cell. It is thus seen that each opposite face of each cell frame 2 is in engagement with the marginal zone 9 of two adjacent bipolar electrodes 1.

Figure 4:
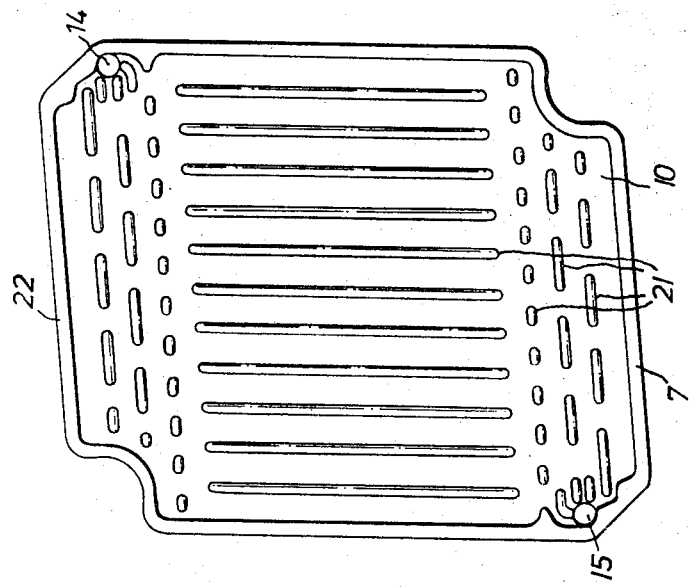
FIG. 4 is a side elevational view, from the gas side of an active electrode layer shown in the absence of its supporting foil.

Turning in particular to FIG. 4, the bipolar electrode 1 further has gas channel systems embossed into the catalyst layers 7, 8 as it will be described later. In this manner between each catalyst layer and the adjoining face of the foil 1 there is provided a closed gas chamber 10. A air admission into and air withdrawal from the gas chamber 10 of the active layer 8 is accomplished through openings 12 and 13 provided in this layer. A fuel gas supply to and withdrawal from the gas chamber 10 of the active layer 7 is accomplished by openings 14 and 15 provided in the last-named layer. By virtue of effecting the gas flow through the electrode layers 7 and 8 by means of the aforedescribed openings, the margin 9 of the electrode 1 does not have to be provided with gas-tight seals, so that this margin does not require a rigid connection with the cell frame 2.

The above-described gas feed permits the provision of a simple seal by elastic flat gaskets 16, 17 (adjacent the active layer 7) and 18,19 (adjacent the active layer 8). Upon tightening the battery into a unit by means of four bolts 20 (only one shown schematically in FIG. 1), the gaskets 16–19 are bilaterally compressed between two adjoining electrodes 1 and thus define gas supply channels of circular section which extend through each cell space normal to the electrode face. The cross section of the gas supply channels may be simply dimensioned according to the required flow rate. Because of the high percentage of inert gas proportion in the air supply, the cross section for the latter should usually be greater than that for the fuel gas.

An electronically conducting bond between the anode layer 7, the graphite foam foil 6 and the cathode layer 8 may be effected, for example, by gluing these components together with a two-component hardening resin under a pressure of approximately 100 kp/cm² or by means of synthetic material sintering under pressure.

By providing the gas-side electrode face of each layer 7, 8 by raised portions 21 (FIG. 4) which may be, for example, webs, a uniform supply of the entire electrode surface with reaction gas is ensured. The gas chambers 10 which are closed by a raised, uninterrupted edge 22 of the electrode layers 7, 8 at all sides, communicate with the openings 12, 13 and 14, 15 disposed at diagonal corners on the layers 8 and 7, respectively. Accordingly, the catalyst layer 8 circumvents the seals 18 and 19, while the catalyst layer 7 circumvents the seals 16 and 17. In this manner an intermixing of the two reaction gases is effectively prevented.

The openings 12–15 in each electrode 1 thus form, together with the elastic sealing elements 16–19 gas supply channels of circular cross section which extend in the longitudinal direction of the battery and which are coupled to the openings of the adjacent electrode 1. These gas supply channels pass only through the electrode layers 7 and 8 and through the foil 6 of the electrode 1 and thus provide a gas supply means for the individual cells without connection to the cell frame 2 so that the difficult sealing problems that occur in this respect in conventional bipolar thin-layered electrodes are not present here.

Figure 2B:
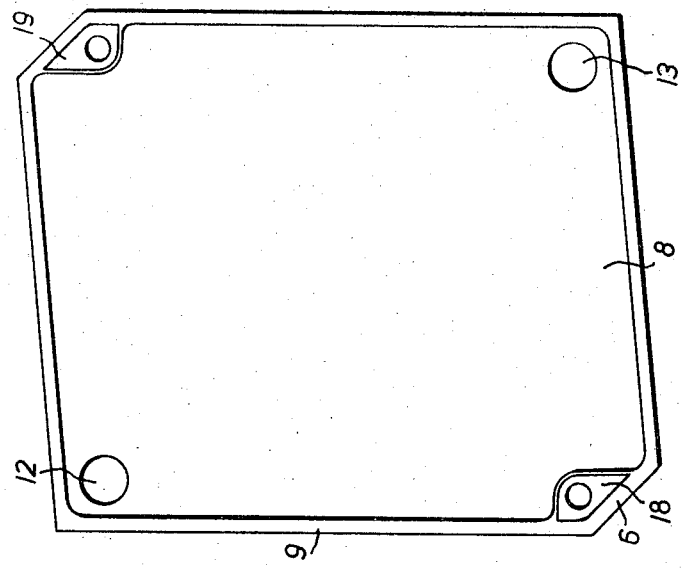
FIGS. 2a and 2b are side elevational views of opposite faces of a bipolar electrode forming part of the preferred embodiment.
Figure 2A:
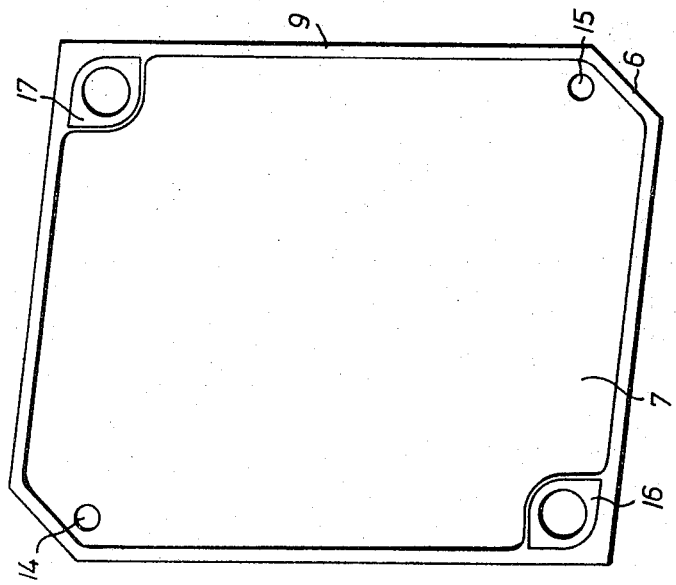
Figure 3:
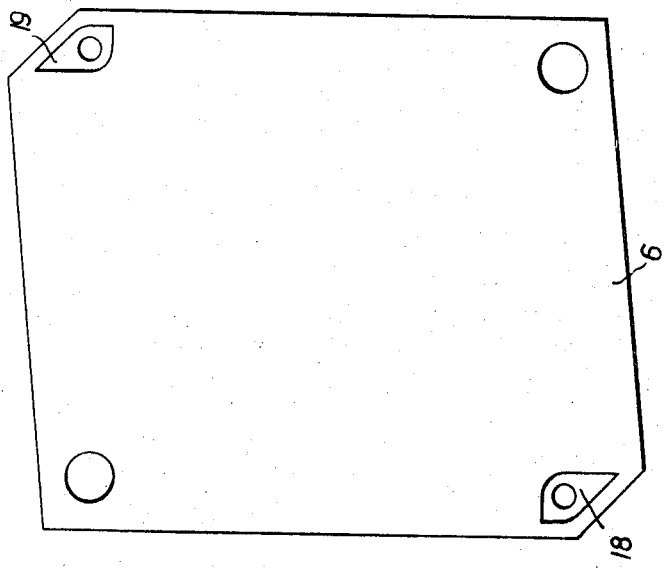
FIG. 3 is a side elevational view of a component forming part of a bipolar electrode and shown in the absence of an active electrode layer thereon.
Figure 5:
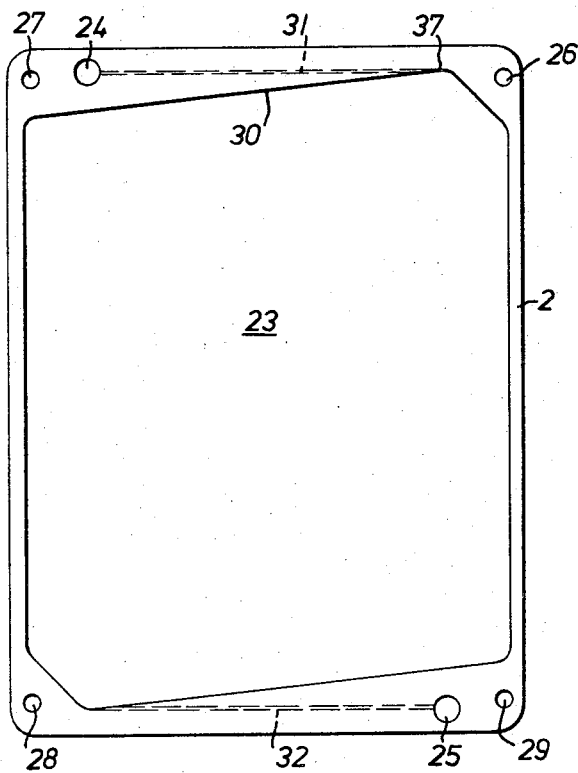
FIG. 5 is a side elevational view of a cell frame forming part of the preferred embodiment.

As it may be further observed, for example in FIGS. 2a, 2b and 5, the perimeter of the electrode 1 and the inner perimeter of the cell frame 2 defining a cutout 23 which constitutes an electrolyte chamber have adjoining edges that form oblique angles. The frame 2 has bores 24, 25 for the electrolyte supply and clamping bores 26, 27, 28 and 29. In this manner a favorable ratio between the active electrode surface and the rectangular battery cross section is obtained. Gas bubbles which are generated in the electrolyte chamber formed of the cutout 23 may be led away from the highest location 37 of the electrolyte chamber (bounded by an upper inner edge 30 of the frame 2) by means of a narrow electrolyte channel 31 provided in the cell frame 2 and maintaining communication between the location 37 and the main electrolyte bore 24. In this manner the gas bubbles which might be admitted into the electrolyte circuit and which would then accumulate in the upper part of the electrolyte chamber 23 are prevented from blocking a part of the active electrode surface.

In the cell frame 2 there is further provided an electrolyte channel 32 which leads to the main electrolyte bore 25 and which opens into a location of the electrolyte chamber that is remote from the highest location 27. The electrolyte channels 31 and 32 are very long with respect to their diameter (approximately 1 mm), so that there is obtained a high-ohmical electrolyte path, whereby the losses through the electrolyte shunts in case of a common electrolyte circulation in all the serially connected cells are maintained at a small value.

Due to the very small thickness of the electrode 1 and the cell frame 2, the total thickness of one cell amounts to approximately 3 mm.

The cell frame 2, made of a synthetic material hermetically seals the associated cell from the external environment by virtue of its pressed engagement with a margin 9 of an electrode 1 on each side (FIG. 1).

The separator grid or comb 3 (FIG. 1) inserted into the cutout 23 of the cell frame 2 effects an electric separation and prevents a short circuit between two electrode faces of adjacent electrodes oriented towards one another. Since, because of the heat and alteration in the concentration, the electrolyte has to be in circulation, the separator comb 3 has openings 33 through which the electrolyte may flow unimpeded while it is obstructed in its flow by the porous comb components 34.

In addition, to maintain the space between two adjacent electrodes 1, the separator comb 3 serves further to satisfy the requirement for an easy mobility of the electrolyte in a direction parallel to the electrode faces. Instead of the structure shown, the separator comb may be constituted of a corrugated or ribbed member. The comb-like configuration illustrated in the figures has the advantage that a smallest possible distance between the electrodes is ensured and thus a substantial reduction in the entire battery volume is accomplished. The separator comb 3 is made of an electrically insulating, highly porous, easily wettable material.

It is noted that the separator comb 3 may be omitted altogether in case the layers of electrodes oriented towards one another are made of an electrically insulating material.

By using the wedge-shaped configuration of the upper side of frame 2 for accommodating therein the main electrolyte bore 24 and the electrolyte channel 31 there is accomplished a good space utilization of the battery that has a rectangular, smooth external shape. The clamping means 20 disposed in the four corners and the guidance of the gas through the cell spaces also contribute to this feature.

The metallic clamping plate 5 has synthetic bushings 35 and 36 for the electrolyte coupling. Thus, the electrolyte is admitted through the bushing 35 and it flows through the main electrolyte bores 25 into the lower electrolyte channels 32 and climbs through the separator comb 3 disposed in the cell frames 2 up to the highest position 37 in the cell frame 2 and then passes through the electrolyte channels 31 and is admitted into the main electrolyte bore 24 wherefrom it exits through the bushing 36.

The two end electrodes 4 (only one shown in FIG. 1) are made of a graphite foam foil similar to the electrodes 1. Each end electrode 4 is provided only with a sole active electrode layer, in each instance for completing the terminal cell at either end of the battery. The layerless side 38 of the graphite foam foil of the end electrode 4 engages face-to-face the metallic clamping plate 5 and transmits the electric current thereto which is drawn from the battery through a terminal 39.

The clamping plate 5 further carries synthetic bushings 40, 41 for the coupling of air and synthetic bushings 42, 43 for the coupling of fuel gas.

The clamping plates 5 are made expediently of thin aluminum or a light-weight alloy and have along their edges reinforcing ribs 44 so that, for the sealing of the battery, a uniform pressure can be accomplished along the edge zones by means of only four clamping bolts 20 which are passed only through bores 26–29 of the cell frame 2 and which thus do not engage the electrodes 1.

For a 40-cell battery the additional weight of two clamping plates 5 with the clamping bolts 20 is less than 10 percent of the total battery weight.

The advantages accomplished with the invention reside particularly in that there is obtained a high-voltage fuel cell battery in which the output voltage appears at the clamping plates without internal or external wiring thereof. Since for assembling the elements 1, 2 and 3 into a battery neither gluing nor pouring of a material has to be resorted to, a subsequent disassembly of the battery is possible without damaging the structural elements. Complex seals for the cells are entirely absent.

It will be understood that the above description of the present invention is susceptible to various modification, changes and adaptations, and the same are intended to be comprehended within the meaning and range of equivalents of the appended claims.

We claim:

1. A gas fuel cell battery comprising in combination:
   a. a plurality of bipolar electrodes each including a flexible graphite foam foil having opposite faces, an active electrode layer secured to each face of said foil, one layer being an anode and the other layer being a cathode, a marginal zone on each foil face bounded by the perimeter of said foil and the perimeter of the active layer, means defining a gas chamber between each active layer and the foil face to which it is secured, means defining openings in each active layer for providing access to said gas chambers for an air and fuel gas supply;
   b. a plurality of cell frames each having two opposite faces, each face of each cell frame being in engagement with a separate bipolar electrode along said marginal zone thereof, each cell frame including means defining throughgoing main electrolyte bores and electrolyte channels contained in said cell frame, each said electrolyte channel communicating with one of said main electrolyte bores, said bipolar electrodes and said cell frames being arranged alternatingly in a juxtapositioned face-to-face series; and
   c. securing means for holding said series together.

2. A gas fuel cell battery as defined in claim 1, said means defining said gas chamber includes a plurality of raised portions on that face of each active layer that is oriented towards said foil which supports it, said raised portions forming a channel system for guiding gases over the surface of each active electrode layer.

3. A gas fuel cell battery as defined in claim 1, wherein each cell frame has an inner perimeter defining a cutout in said cell frame, said inner perimeter and the perimeter of each foil have an oblique-angled configuration, said cutout has a highest location which is in communication with one of said throughgoing main electrolyte bores by means of one of said electrolyte channels.

4. A gas fuel cell battery as defined in claim 3, wherein each said cutout has a further location remote from said highest location, said further location is in communication with another one of said throughgoing electrolyte bores by means of another one of said electrolyte channels.

5. A gas fuel cell battery as defined in claim 1, including means defining a cutout in each said cell frame and separator means disposed in said cutout, said separator means is made of an electrically insulating, readily wettable and highly porous material.

6. A gas fuel cell battery as defined in claim 5, wherein said separator means has a comb-like configuration.

7. A gas fuel cell battery as defined in claim 1, further including
   d. two end electrodes at each end of said series, each end electrode including a graphite foam foil having opposite faces, an active electrode layer secured to one face of said graphite foam foil of each end electrode and oriented towards said series, the active electrode layer of each end electrode completing the battery at each end of said series; and
   e. two metal clamping plates arranged in a face-to-face engagement with that face of the graphite foam foil of each end electrode that is remote from the active layer thereon, said clamping plates forming part of said securing means.

8. A gas fuel cell battery as defined in claim 7, including means defining throughgoing apertures in said clamping plates in alignment with said openings in said active layers and with said main electrolyte bores in said cell frames and a coupling bushing inserted into each said throughgoing aperture of each clamping plate.

9. A gas fuel cell battery as defined in claim 7, said clamping plates are made of a light metal alloy and serve as battery poles.

10. A gas fuel cell battery as defined in claim 9, including reinforcing ribs provided on said clamping plates.

11. A gas fuel cell battery as defined in claim 1, wherein said securing means includes tightening means and elastic means for resiliently clamping each bipolar electrode between two cell frames.

* * * * *